United States Patent
Plazak et al.

(10) Patent No.: US 12,020,671 B2
(45) Date of Patent: *Jun. 25, 2024

(54) DATA EXCHANGE FOR MUSIC CREATION APPLICATIONS

(71) Applicant: Avid Technology, Inc., Burlington, MA (US)

(72) Inventors: Joseph Plazak, Verdun (CA); Samuel Lambert, Montréal (CA); Joseph Pearson, London (GB); Sylvain Girard, Montréal (CA)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,516

(22) Filed: Sep. 12, 2023

(65) Prior Publication Data

US 2024/0021179 A1  Jan. 18, 2024

Related U.S. Application Data

(63) Continuation of application No. 17/095,815, filed on Nov. 12, 2020, now Pat. No. 11,763,787.
(Continued)

(51) Int. Cl.
*G10H 1/00* (2006.01)
*G06F 3/16* (2006.01)
*G11B 27/031* (2006.01)

(52) U.S. Cl.
CPC .......... *G10H 1/0066* (2013.01); *G06F 3/165* (2013.01); *G11B 27/031* (2013.01)

(58) Field of Classification Search
CPC ...... G10H 1/0066; G06F 3/165; G11B 27/031
(Continued)

(56) References Cited

U.S. PATENT DOCUMENTS

| | | | |
|---|---|---|---|
| 6,794,566 B2 * | 9/2004 | Pachet | G06F 16/30 |
| | | | 84/645 |
| 7,733,858 B1 * | 6/2010 | Fay | H04L 47/2466 |
| | | | 370/389 |

(Continued)

FOREIGN PATENT DOCUMENTS

| | | | | | |
|---|---|---|---|---|---|
| CN | 105791976 A | * | 7/2016 | | G11B 27/031 |
| EP | 051992 | * | 5/1992 | | G01H 1/0075 |

(Continued)

*Primary Examiner* — Christina M Schreiber
(74) *Attorney, Agent, or Firm* — Oliver Strimpel

(57) ABSTRACT

An operator of a digital audio workstation (DAW) application is able to assign individual tracks of a DAW session for export to specific players within a musical score of a scorewriter application. The DAW operator associates each track with a player identifier, which is retained in association with an interoperable format file generated by the export process. When the scorewriter imports such a file, it extracts the player identifier and uses it to map the track to a scored instrument. The mapping may also depend on a scorewriter arrangement of players for the instruments. The DAW operator may assign multiple tracks representing a given instrument played with different techniques to a single instrument part in a score. The playing techniques for the instruments are also associated with the tracks and may be parsed by the scorewriter to annotate the score with the corresponding notations.

20 Claims, 5 Drawing Sheets

Related U.S. Application Data

(60) Provisional application No. 63/022,607, filed on May 11, 2020.

(58) Field of Classification Search
 USPC .......................................................... 84/645
 See application file for complete search history.

(56) References Cited

U.S. PATENT DOCUMENTS

| | | | | |
|---|---|---|---|---|
| 10,861,429 B2* | 12/2020 | Godunov | | G10H 1/0066 |
| 11,763,787 B2* | 9/2023 | Plazak | | G11B 27/031 |
| | | | | 84/645 |
| 2005/0066796 A1* | 3/2005 | Hikawa | | G10H 1/0066 |
| | | | | 84/603 |
| 2005/0109194 A1* | 5/2005 | Gayama | | G10H 1/00 |
| | | | | 84/613 |
| 2008/0271592 A1* | 11/2008 | Beckford | | G10H 1/0008 |
| | | | | 84/645 |
| 2009/0301287 A1* | 12/2009 | Harvey | | G10H 1/0025 |
| | | | | 84/609 |
| 2009/0301288 A1* | 12/2009 | Harvey | | G10H 1/0066 |
| | | | | 84/645 |
| 2011/0011246 A1* | 1/2011 | Buskies | | G10H 1/0066 |
| | | | | 84/613 |
| 2011/0061514 A1* | 3/2011 | Yokoyama | | G10H 1/0066 |
| | | | | 84/601 |
| 2015/0095822 A1* | 4/2015 | Feis | | G06F 3/04842 |
| | | | | 715/765 |
| 2018/0190250 A1* | 7/2018 | Hiskey | | G10H 1/46 |
| 2021/0350779 A1* | 11/2021 | Plazak | | G06F 3/165 |
| 2023/0186884 A1* | 6/2023 | Koretzky | | G10G 1/00 |
| | | | | 84/611 |
| 2024/0021179 A1* | 1/2024 | Plazak | | G10H 1/0066 |

FOREIGN PATENT DOCUMENTS

| | | | | | |
|---|---|---|---|---|---|
| JP | 3061906 | B2 | * | 7/2000 | ........... G10H 1/0075 |
| JP | 2004046575 | A | * | 2/2004 | |
| JP | 2004279756 | A | * | 10/2004 | |
| JP | 2013171070 | A | * | 9/2013 | |
| JP | 2014508460 | A | * | 4/2014 | |
| KR | 20140119473 | A | * | 10/2014 | |
| KR | 101468411 | B1 | * | 12/2014 | |
| WO | WO-2016028433 | A1 | * | 2/2016 | ........... G10H 1/0025 |

* cited by examiner

| Track | Instrument | Technique |
|---|---|---|
| Synth Lead #melody | Piccolo #melody<br>Flute #melody | |
| Bass (Bowed) #bass | Contrabass #bass | arco |
| Bass (Pizzicato) #bass | Contrabass #bass | pizz. |
| Choir Chords #SATB | Soprano #SATB, Alto #SATB,<br>Tenor #SATB, Bass #SATB | |
| Jazz Drum Set #percussion | Drums #percussion | |

DATA EXCHANGE FOR MUSIC CREATION APPLICATIONS

CROSS REFERENCE TO RELATED APPLICATION

This application claims priority to and the benefit of, under 35 U.S.C. § 120, and is a continuation application of U.S. patent application Ser. No. 17/095,815, filed Nov. 12, 2020, which claims right of priority to and the benefit under 35 U.S.C. § 119(e) of U.S. provisional patent application Ser. No. 63/022,607, filed May 11, 2020, both of which are incorporated herein by reference.

BACKGROUND

Perhaps the most common form of cross-platform communication between Digital Audio Workstations (DAWs) and scorewriter programs occurs via the export and subsequent import of a MIDI file. DAWs represent musical compositions as a set of tracks that are usually displayed graphically within a timeline. On the other hand, scorewriter applications represent compositions as a music score. Since these representations are very different from each other, decisions need to be made as to how the DAW representation is to be expressed within a score. There is no established method of allowing a user to express how they would like MIDI information from a DAW session to be translated into a musical score. Instead, users must rely on default MIDI file import algorithms and laborious copy and paste tasks within a scorewriter in order to properly map, merge, and expand musical information from their DAW session into an acceptable musical score.

SUMMARY

In general, data is exchanged between two music creation programs by adding new information to an existing field used to represent a musical composition in the first application using a syntax that is shared with the second application. The presence of the new information may be signaled using a tagged identifier.

In general, in a first aspect, a method of exporting a musical composition from a first music creation application of a first type to a second music creation application of a second type comprises: enabling an operator of the first music creation application to edit a name of an element of the musical composition in the first music creation application by inserting an identifier into the name; in response to a command received by the first music creation application to export the musical composition, using the first music creation application to: convert the element into a file in an interoperable format, wherein the file includes the edited name including the identifier; and export the file; and in response to a command received by the second music creation application to import the musical composition, using the second music creation application to: import the file; parse the file to extract the identifier from the edited name of the element of the musical composition; interpret the identifier as a basis for handling the element of the musical composition in the second music creation application; and interpret a portion of the edited name of the element other than the identifier as a name of the element.

Various embodiments include one or more of the following features. The first type of music creation application is different from the second type of a music creation application. The first type of music creation application is a digital audio workstation application and the second type of music creation application is a scorewriter application. The element is a track of the musical composition. The identifier specifies a player that is to play the element of the musical composition. The second music creation application uses the specified player as a basis for assigning the element to a musical instrument represented on a musical score of the musical composition. The first music creation application and the second music creation application are scorewriter applications. The identifier is used by the second music creation application as a basis for assigning the element to a musical instrument represented on a musical score of the second music creation application.

In general, in a second aspect, a method of exporting a musical composition from a digital audio workstation application to a scorewriter application comprises: enabling an operator of the digital audio workstation application to associate an identifier with a first track of the musical composition, wherein the identifier specifies a player to which the first track is assigned; in response to a command to export the musical composition, using the digital audio workstation application to convert the first track into a first file in an interoperable file format, wherein a name of the first file includes the identifier; in response to a command to import the musical composition, enabling the scorewriter application to: import the first file; extract the identifier from the name of the first file; use the identifier as a basis for assigning the first track to an instrument within a musical score representing the musical composition; and convert the first file into a first portion of a musical part for the instrument within the musical score.

Various embodiments include one or more of the following features. The instrument to which the first track is assigned is able to generate a first sound type, and the first track includes a portion of the musical part for the instrument for which the instrument is to generate the first sound type, further comprising including an indication on the score for the player to play the first portion with the first sound type. Enabling the operator of the digital audio workstation application to associate the identifier with a second track of the musical composition, wherein the second track includes a second portion of the musical part for the instrument for which the instrument is to generate a second sound type, further comprising: in response to the command to export the musical composition, using the digital audio workstation application to convert the second track into a second file in an interoperable file format, wherein a name of the second file includes the identifier; in response to a command to import the musical composition, enabling the scorewriter application to: import the second file; extract the identifier from the name of the second file; use the identifier as a basis for assigning the second track to the instrument within the musical score representing the musical composition; convert the second file into a second portion of a musical part for the instrument within the musical score; and include an indication on the score for the player to play the second portion with the second sound type. The first sound type and the second sound type are generated by playing the instrument with a first technique and a second technique respectively. The indication to the player is an absence of a notation of a technique. Enabling an operator of the scorewriter application to specify an arrangement of players to instruments within the musical score; and using the specified arrangement as a second basis for assigning the first track to the instrument. The arrangement includes an arrangement of a given player to a plurality of instruments.

In general, in further aspect, a computer program product comprises: a non-transitory computer-readable medium with computer-readable instructions encoded thereon, wherein the computer-readable instructions, when processed by a processing device instruct the processing device to perform a method of exporting a musical composition from a first music creation application of a first type to a second music creation application of a second type, the method comprising: enabling an operator of the first music creation application to edit a name of an element of the musical composition in the first music creation application by inserting an identifier into the name; in response to a command received by the first music creation application to export the musical composition, using the first music creation application to: convert the element into a file in an interoperable format, wherein the file includes the edited name including the identifier; and export the file; and in response to a command received by the second music creation application to import the musical composition, using the second music creation application to: import the file; parse the file to extract the identifier from the edited name of the element of the musical composition; interpret the identifier as a basis for handling the element of the musical composition in the second music creation application; and interpret a portion of the edited name of the element other than the identifier as a name of the element.

In general, in yet another aspect, a system comprises: a memory for storing computer-readable instructions; and a processor connected to the memory, wherein the processor, when executing the computer-readable instructions, causes the system to perform a method of exporting a musical composition from a first music creation application of a first type to a second music creation application of a second type, the method comprising: enabling an operator of the first music creation application to edit a name of an element of the musical composition in the first music creation application by inserting an identifier into the name; in response to a command received by the first music creation application to export the musical composition, using the first music creation application to: convert the element into a file in an interoperable format, wherein the file includes the edited name including the identifier; and export the file; and in response to a command received by the second music creation application to import the musical composition, using the second music creation application to: import the file; parse the file to extract the identifier from the edited name of the element of the musical composition; interpret the identifier as a basis for handling the element of the musical composition in the second music creation application; and interpret a portion of the edited name of the element other than the identifier as a name of the element.

BRIEF DESCRIPTION OF THE DRAWINGS

FIG. 3 shows a table of the arrangement of MIDI tracks imported from the digital audio workstation timeline of FIG. 2 to instruments in a scorewriter application.

FIG. 5 shows a score rendering of the tracks imported from digital audio workstation timeline shown in FIG. 2 in which the tracks are directed to instruments in a score in accordance with the assignment of tracks to players shown in FIG. 2 and the arrangement of players to instruments tabulated in FIG. 3.

DETAILED DESCRIPTION

Figure 1:
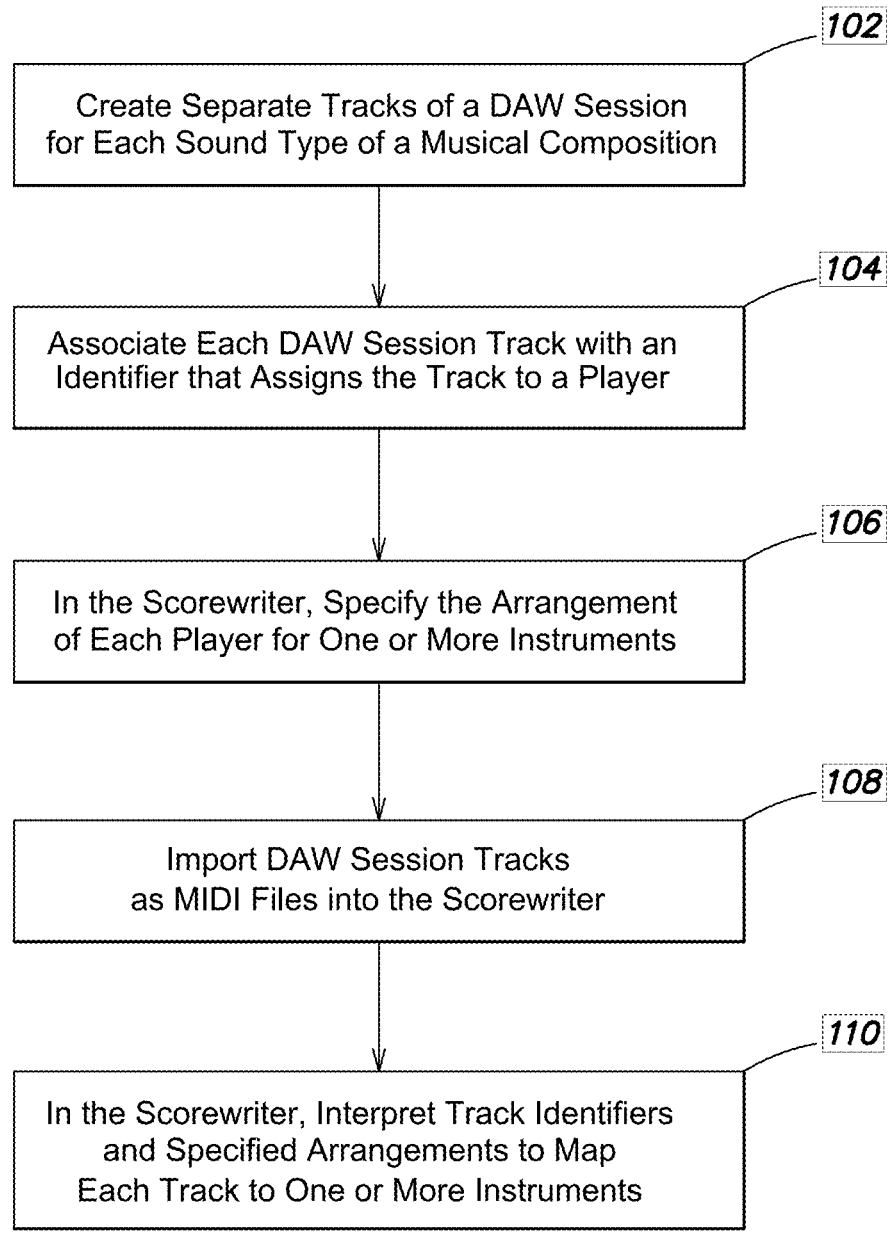
FIG. 1 is a high-level flow diagram of a method for directing tracks exported from a digital audio workstation application to musical instrument staves within a scorewriter application.

We describe herein methods of cross-platform communication between two music creation applications such as between a DAW application and a scorewriter application. In one use case, the methods enable a DAW user to specify how data from a DAW is to be imported into the scorewriter application and arranged onto musical score.

As used herein, a DAW is an electronic device or software application used for recording, editing, and producing audio files. An example of a DAW is Pro Tools® from Avid® Technology, Inc., of Burlington, Massachusetts. A scorewriter application, also commonly referred to a music notation program, is software that is used for creating, editing, and printing sheet music. An example of a scorewriter application is Sibelius®, also from Avid Technology, Inc.

The need for improved communication methods between DAWs and scorewriter applications arises from their different representations of musical information. In a DAW session, a different track is usually allocated to each type of sound. In some cases, when a composition only requires a given player to produce a single sound type, there is a one-to-one mapping of sound types to players that render the sound type. However, if the composition includes more than one sound type to be rendered by a given player, there is a many-to-one mapping from tracks to players. The different sound types usually correspond to the use of different techniques by the instrument player. For example, violin-playing techniques include playing with a bow, plucking the strings, playing with artificial harmonics, and using a mute. Each of these four techniques creates its own sound type and is represented on a dedicated track of a DAW session. However, they are all to be played by single player and in a score they would be represented as notes on a single instrument stave representing the violin part. On the score, the different techniques that instruct the player to generate the desired sound type are indicated by score notations: arco, pizz., an empty diamond note, and con sord. respectively. The notes of a given player may also be performed with techniques corresponding to different articulations, each of which is represented by its own DAW track, and which are also all shown as notes with annotations on the same instrument stave in a score. Examples of such articulation technique representations include a dot for staccato, a slur for legato, and a chevron for an accent. Thus, when exporting a DAW session to a scorewriter, multiple DAW tracks may be assigned to a single player, and the corresponding techniques are notated on the score to instruct players to create the various sound types represented by each of the DAW tracks. It is therefore desirable for a DAW operator to be able to specify a player to which a track is assigned. In addition, the information that specifies the techniques used to generate a track's sound also needs to be transferable to the scorewriter when exporting a DAW session.

In general, the mechanism for exchanging additional data between two music creation programs in order to specify in a first application how a musical composition is to be represented or handled in a second application includes adding new information to an existing field used to represent the composition in the first application using a syntax that is shared with the second application. One syntax for transferring the extra information is to insert an identifier into an existing field and to precede it with a tag, such as a hashtag (#) symbol.

More specifically, in order to enable DAW operators to specify how DAW session information should be imported into the scorewriter, the mechanism enables tracks to be assigned to scorewriter players. This may be achieved by creating a unique player identifier for each set of tracks that is to be performed by a given player. A player identifier may be added as a tag to track names within the DAW session. By inserting the appropriate tags within the DAW track names, the DAW operator is able to specify the set of tracks that are to be played by a given player. Any identifier syntax known to both the DAW and the scorewriter may be used. When the DAW operator exports a musical composition, the composition is converted into an interoperable format, such as a set of MIDI files, one for each of the DAW session tracks. The names given to each MIDI file may be copied from the name of the track from which they were generated and include the inserted identifiers. When the scorewriter application imports the MIDI tracks from the DAW, it parses the incoming track names to extract the strings corresponding to the player identifiers.

Information specifying the assignment of a track to a player may be included as metadata within a MIDI file when the MIDI file is generated from a DAW track in a field other than the track name. Within a DAW, a track may have a number of metadata fields such as bit depth, sampling rate, and notes. An identifier specifying the assignment of the track to a player may be inserted into any track-specific metadata field and may be exported along with other MIDI data, and interpreted by a scorewriter application in a manner similar to that described above in connection with the embedding of this information within the track name.

In addition, an operator of a scorewriter application is able to choose an arrangement for the composition, in which the players are arranged onto the score for the musical instruments that play the composition. Arrangements may include one-to-one mappings and one-to-many mappings of players to instruments. Each of these mappings are illustrated in the example described below. Thus, a final destination of the audio data represented by a given track within a DAW session depends both on the assignment within the DAW of the track to a player and on the arrangement within the scorewriter application of the player to instruments on the score.

Figure 2:
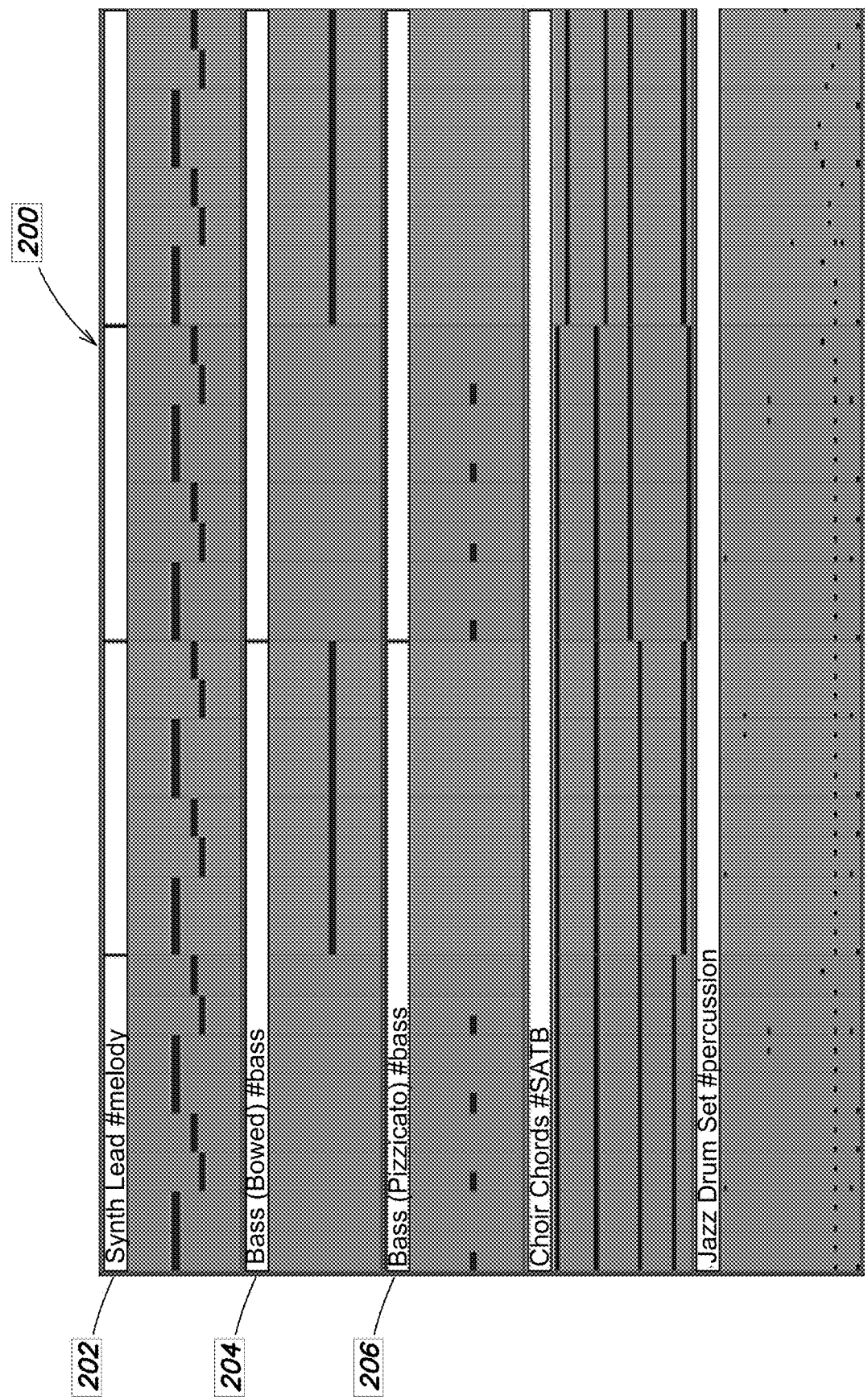
FIG. 2 is a diagrammatic representation of tracks within a timeline of a digital audio workstation application with the track names including a player identifier.

FIG. 1 is a high-level flow diagram of the steps involved in enabling a scorewriter to map an imported DAW session to instruments automatically in accordance with DAW player assignments and a specified scorewriter arrangement. The various steps are illustrated by the specific example shown in FIGS. 2-5. During the course of creating a musical composition, a DAW operator creates separate tracks for each sound type that will form a part of a musical composition (step 102). FIG. 2 is a diagrammatic screenshot of five tracks as they would appear within timeline 200 of a DAW session to create the composition. The time axis is horizontal, and each bar represents a sound having a temporal offset and duration corresponding to the bar's horizontal position and length respectively. From top to bottom, the tracks are Synth Lead, Bass (Bowed), Bass (Pizzicato), Choir Chords, and Jazz Drum Set. These include two separate tracks for the bass: one for a bowed bass sound and one for a pizzicato bass sound.

The DAW operator assigns each track of the DAW session to a player that is to be used to render the track (step 104). In the described embodiment, the assignment is implemented by adding to the name of the track an identifier that uniquely defines the chosen instrument or player. In the syntax adopted by the implementation shown in FIG. 2, a hashtag symbol precedes the identifier, as shown for example in track name 202 which indicates that the Synth Lead track is assigned to the melody player. The bowed bass and the pizzicato bass tracks are assigned to the same player, i.e., bass, as shown at 204 and 206 respectively.

Within the scorewriter, the operator specifies an arrangement of the players for the instruments on the score (step 106). The arrangement may direct a given player to a single instrument or to multiple instruments. FIG. 3 shows a table 300 of the arrangements of the players to instruments for the DAW tracks shown in FIG. 2. The Jazz Drum Set track, assigned to the "percussion" player is arranged for the Drums instrument using a one-to-one arrangement. For the "melody" player, the scorewriter operator has chosen a one-to-two arrangement, in which the Synth Lead Track is arranged for both the Piccolo and the Flute instruments. For the "bass" player, the Bass (Bowed) and Bass (Pizzicato) tracks are arranged for the Contrabass instrument in a one-to-one arrangement, with the notes originating from the Bass (Pizzicato) track having a pizzicato notation. The SATB player is "exploded" into four instruments in a one-to-many arrangement, with the scorewriter arranging the notes of a chord from the highest to the lowest onto the soprano, alto, tenor, and bass choir singers (i.e., vocal instruments) respectively.

Figure 4:
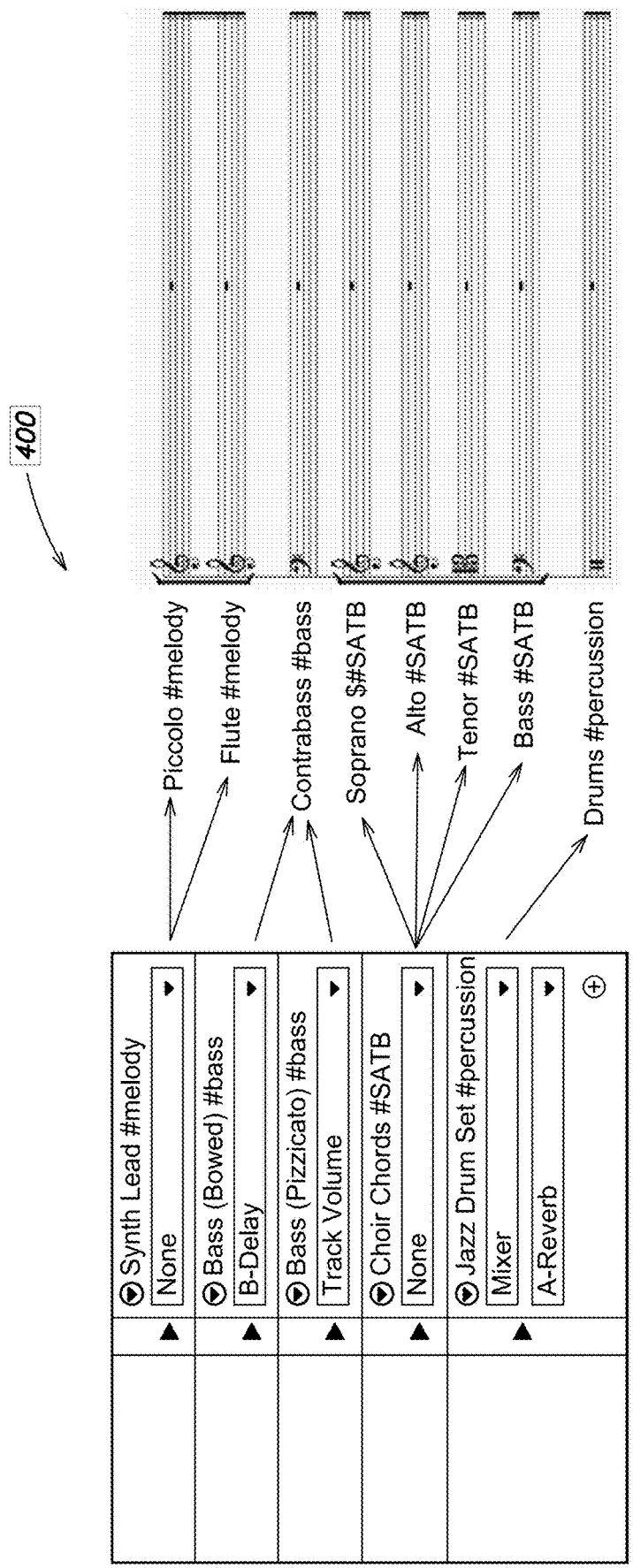
FIG. 4 is a diagram indicating the mapping of the tracks in a digital audio workstation application to instruments in a scorewriter application.

When the DAW session is to be imported into the scorewriter application (step 108), the DAW tracks are converted into MIDI files, one for each track. The scorewriter application imports the MIDI files and interprets the incoming track names (i.e., the MIDI file names), parsing the track naming syntax to extract the identifiers that associate each track with its assigned player. It also applies the scorewriter operator's arrangement of players onto destination instruments of the score to perform an automatic mapping from DAW tracks to scorewriter instruments (step 110). Mapping 400 of tracks to instruments for the example described in FIGS. 2 and 3 is illustrated in FIG. 4.

The parsing of the incoming track names also searches for the presence of one or more of a list of techniques. These may be found by string matching the incoming track names with a stored list of techniques. When the scorewriter identifies a technique in a track name, it renders notes from that track accordingly. For example, if "staccato" is present within the track name, the notes of the track are drawn as staccato notes, i.e., with dots above or below them. Multiple techniques may be included in a track name and each of them may be identified and displayed appropriately. For example, for an incoming track named Violin (staccato pizzicato), the scorewriter application is able to use a predetermined list of instrument names and techniques to identify each of these and display the track notes accordingly. For the example illustrated in FIGS. 2-5, incoming track name Bass (Pizzicato) 206 is identified as an instrument played with a pizzicato technique and is rendered accordingly on the score shown in FIG. 5 with the "pizz." annotation. Similarly, incoming track name Bass (Bowed) is identified as an instrument played with a bow and may be rendered on the score with the "arco" designation. In some implementations, an instrument name present within an incoming MIDI track name is also identified (e.g., Bass), and this may be used as a default assignment to a player (i.e., bass). However, a player that is explicitly specified by a player identifier in the track name takes priority over default assignments.

Figure 5:
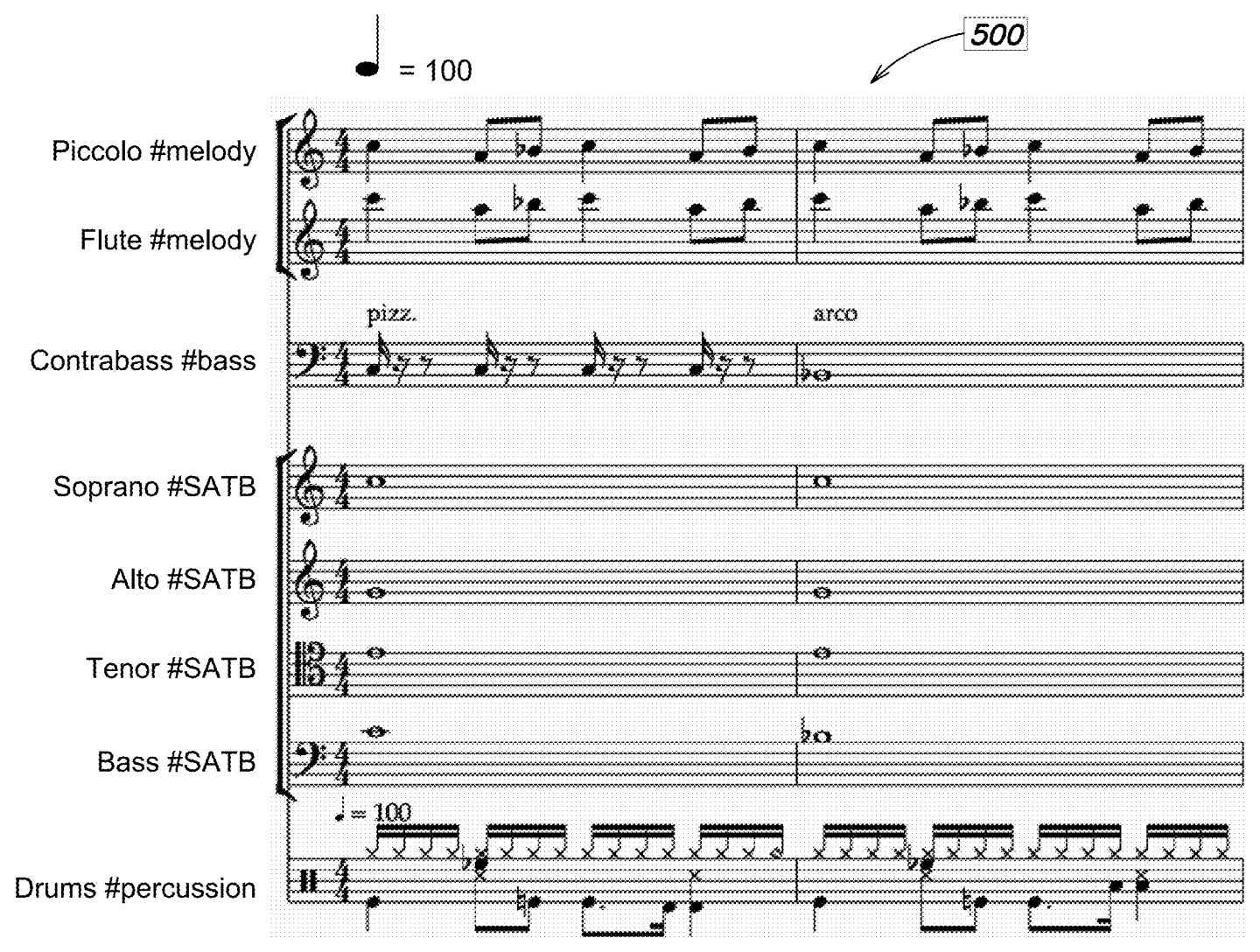

Resulting score 500 is shown in FIG. 5 in which the imported tracks from the DAW session of FIG. 2 are automatically drawn onto the staves following an automatic interpretation of player identifiers assigned by the DAW operator and the arrangement of players for instruments specified by the scorewriter operator. In the figure, the player identifiers to which the tracks were assigned in the DAW are shown as part of the instrument names for exposition purposes, but their display within the score is usually not required.

The process described above may be reversed in order to convert a score into a corresponding DAW session. The player identifiers in the instrument names for each stave are used to assign each instrument to a corresponding player, i.e., performing a "reverse arrangement." Any techniques notated within the score for a given instrument are associated with their respective players and represented in a form such as that of the table shown in FIG. 3. This is used to determine the set of tracks needed in the exported DAW session. The notes for each of the instrument and technique combinations are then mapped to a corresponding track of the DAW session, and the temporal locations and durations are determined by parsing the time signature, tempo designation, measures, rests, note durations, and other rhythm indicators present in the score. The mechanism by which certain techniques represented in the score, e.g., accent or staccato, is conveyed within an exported MIDI file may include MIDI playback effects, which reproduce note-playing techniques by adjusting MIDI parameters such as note duration and velocity.

While the data exchange methods described herein have involved the export of tracks from a DAW application to a scorewriter application, they may be used to exchange data between any type of music creation program. For example, data may be exchanged between two scorewriter applications. In one workflow, such data exchange may be used when the work of transcribing or re-arranging an orchestral score is divided amongst several people, often based on their expertise. For example, a brass player may arrange the brass instruments and a string player may arrange the string instruments. Each arranger may prefer a particular scorewriter application, with the result that the various sections of an orchestra may be arranged using different scorewriter applications. To create the overall orchestral score, all of the arrangements must be assembled into a common file. The described data exchange methods facilitate the automation of this workflow. Examples include importing a subset of instrument staves from a partial score into a master score, reducing the contents of a partial score with multiple instrument staves into a condensed version within a master score via many-to-one mappings (e.g., creating a "conductor" score with condensed parts), or arranging a partial score onto multiple locations within a master score via one-to-many mappings. Thus, the automated transfer of data between scorewriter programs may be used to transfer a partial score to a master score, and vice-versa. In each case, the use of identifiers, such as those having the tag syntax described above, allows the scorewriter user to precisely specify how the data is to be transferred from one location to the other. Information in the identifiers may take precedence over additional information, (e.g., non-tagged data such as a stave instrument name), whether contained in the source file or the destination file. The affordances provided by the use of identifiers enable users of one scorewriter application to pre-define partial file conversions, which in turn may facilitate the automated importing of data from a different scorewriter application. Further, the arrangers may generate multiple revisions of their respective parts, e.g., when correcting errors, and in each case, the new work is reimported into a master file. When performed manually, the assembly of the arrangers' work each time a revision is generated involves error-prone copy and paste operations. Using the described data exchange methods, each reimport is accomplished accurately in a single automated step.

The data may be exchanged using MusicXML files rather than MIDI files since MusicXML is able to represent music notation more precisely. As described above for a user of a DAW application, a scorewriter user is able to rename the instruments in a first scorewriter application by adding identifiers. During the MusicXML export process, these instrument names are included in the file as text fields. Upon import into a second scorewriter, the instrument names are parsed to locate and interpret the identifiers. For example, using the SATB example in reverse, the scorewriter user may rename the Soprano, Alto, Tenor, and Bass parts as Soprano #SATB, Alto #SATB, Tenor #SATB, and Bass #SATB. When exported as a MusicXML file, the instrument names are exported with their identifiers. When the MusicXML file is imported into a second scorewriter, these instruments are assigned to the one or more instruments that have been associated with the #SATB identifier within the second scorewriter application.

When the data exchange occurs between scorewriters that are instances of the same application, the scorewriters share a common score document file format. Even in this situation, existing methods of combining all arrangements into a single master score still require laborious copy and paste operations. By adding identifiers to the source material, a user may partially import a subset of data from the source file as the destination file, or a subset of data into the destination file. In addition, in each case, the number of staves used to represent the source material may be reduced or expanded during the data exchange process. With the described insertion of appropriate identifiers, import into a master score and subsequent imports for revisions involves a single automated operation that eliminates the error-prone manual operations.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of exporting a musical composition from a first music creation application of a first type to a second music creation application of a second type, the method comprising:
    enabling an operator of the first music creation application to edit a name of an element of the musical composition in the first music creation application;
    in response to a command received by the first music creation application to export the musical composition, using the first music creation application to:
        convert the element into a file in an interoperable format, wherein the file includes the edited name; and
        export the file; and
    in response to a command received by the second music creation application to import the musical composition, using the second music creation application to:
        import the file;
        parse the file to extract the edited name of the element of the musical composition; and
        interpret the edited name as a basis for handling the element of the musical composition in the second music creation application.

2. The method of claim 1, wherein the first type of music creation application is different from the second type of a music creation application.

3. The method of claim 2, wherein the first type of music creation application is a digital audio workstation application, and the second type of music creation application is a scorewriter application.

4. The method of claim 1, wherein the element is a track of the musical composition.

5. The method of claim 1, wherein the edited name specifies a player that is to play the element of the musical composition.

6. The method of claim 5, wherein the second music creation application uses the specified player as a basis for assigning the element to a musical instrument represented on a musical score of the musical composition.

7. The method of claim 1, wherein the first music creation application and the second music creation application are scorewriter applications.

8. The method of claim 7, wherein the edited name is used by the second music creation application as a basis for assigning the element to a musical instrument represented on a musical score of the second music creation application.

9. A method of exporting a musical composition from a digital audio workstation application to a scorewriter application, the method comprising:
    enabling an operator of the digital audio workstation application to associate a name with a first track of the musical composition, wherein the name specifies a player to which the first track is assigned;
    in response to a command to export the musical composition, using the digital audio workstation application to convert the first track into a first file in an interoperable file format, wherein the first file includes the name;
    in response to a command to import the musical composition, enabling the scorewriter application to:
        import the first file;
        extract the name from the first file;
        use the name as a basis for assigning the first track to an instrument within a musical score representing the musical composition; and
        convert the first file into a first portion of a musical part for the instrument within the musical score.

10. The method of claim 9, wherein the instrument to which the first track is assigned is able to generate a first sound type, and the first track includes a portion of the musical part for the instrument for which the instrument is to generate the first sound type, further comprising including an indication on the score for the player to play the first portion with the first sound type.

11. The method of claim 10, further comprising:
enabling the operator of the digital audio workstation application to associate the name with a second track of the musical composition, wherein the second track includes a second portion of the musical part for the instrument for which the instrument is to generate a second sound type, further comprising:
in response to the command to export the musical composition, using the digital audio workstation application to convert the second track into a second file in an interoperable file format, wherein the second file includes the name;
in response to a command to import the musical composition, enabling the scorewriter application to:
import the second file;
extract the name of the second file;
use the name as a basis for assigning the second track to the instrument within the musical score representing the musical composition;
convert the second file into a second portion of a musical part for the instrument within the musical score; and
include an indication on the score for the player to play the second portion with the second sound type.

12. The method of claim 11, wherein the first sound type and the second sound type are generated by playing the instrument with a first technique and a second technique respectively.

13. The method of claim 11, wherein the indication to the player is an absence of a notation of a technique.

14. The method of claim 9, further comprising:
enabling an operator of the scorewriter application to specify an arrangement of players to instruments within the musical score; and
using the specified arrangement as a second basis for assigning the first track to the instrument.

15. The method of claim 14, wherein the arrangement includes an arrangement of a given player to a plurality of instruments.

16. A computer program product comprising:
a non-transitory computer-readable medium with computer-readable instructions encoded thereon, wherein the computer-readable instructions, when processed by a processing device instruct the processing device to perform a method of exporting a musical composition from a first music creation application of a first type to a second music creation application of a second type, the method comprising:
enabling an operator of the first music creation application to edit a name of an element of the musical composition in the first music creation application;
in response to a command received by the first music creation application to export the musical composition, using the first music creation application to:
convert the element into a file in an interoperable format, wherein the file includes the edited name; and
export the file; and
in response to a command received by the second music creation application to import the musical composition, using the second music creation application to:
import the file;
parse the file to extract the edited name of the element of the musical composition; and
interpret the edited name as a basis for handling the element of the musical composition in the second music creation application.

17. A method of handling an element of a musical composition in a first music creation application, the method comprising:
in response to a command received by the first music application to import the musical composition, using the first music creation application to:
import from a second music creation application a file containing an element of the musical composition, wherein a name of the element of the musical composition was edited by an operator of the second music creation application;
parse the file to extract the name of the element of the musical composition; and
interpret the name of the element of the musical composition as a basis for handling the element of the musical composition in the first music creation application.

18. The method of claim 17, wherein the first music creation application is a scorewriter application and the second music creation application is a digital audio workstation.

19. The method of claim 17, wherein the element is a track of the musical composition, and the name specifies a player that is to play the element of the musical composition.

20. The method of claim 19, wherein the first music creation application uses the specified player as a basis for assigning the element to a musical instrument represented on a musical score of the musical composition.

* * * * *